United States Patent [19]

Alschweig et al.

[11] Patent Number: 5,405,248
[45] Date of Patent: Apr. 11, 1995

[54] FLOW REGULATING VALVE

[75] Inventors: Ekkehard Alschweig, Berlin; Ulrich Aldinger, Schwäbisch Gmünd; Reiner Eisenmann, Welzheim, all of Germany

[73] Assignee: Zahnradfabrik Friedrichshafen AG, Friedrichshafen, Germany

[21] Appl. No.: 30,544

[22] Filed: Mar. 12, 1993

[30] Foreign Application Priority Data

Mar. 26, 1992 [DE] Germany .................. 42 09 839.4

[51] Int. Cl.$^6$ .................................. F04B 49/00
[52] U.S. Cl. .............................. 417/300; 251/324
[58] Field of Search .............. 417/300; 137/625.69; 251/324

[56] References Cited

U.S. PATENT DOCUMENTS 4,715,793 12/1987 Johann et al. .................... 417/300
4,862,920 9/1989 Cleasby .......................... 137/625.69

Primary Examiner—Richard A. Bertsch
Assistant Examiner—Peter Korytnyk
Attorney, Agent, or Firm—Albert M. Zalkind

[57] ABSTRACT

A flow regulating valve for rotation piston pumps to regulate a useful flow, especially for auxiliary power steering in motor vehicles, contains in a valve core (2) an axially-movable, spring-loaded flow regulating piston (3). On one front surface (4) of the flow regulating piston (3), there is a control edge (14) by means of which a flowoff cross section in a flowoff duct (15) can be altered. To reduce the flow noises, control edge (14) has a rounded portion (17) at the transition to the generated surface (16) of the flow regulating piston (3). In addition, control edge (14) reveals a negative bezel (18). A positive bezel (21) is arranged between this negative bezel (18) and the rounded portion (17) that adjoins generated surface (16).

6 Claims, 1 Drawing Sheet

5,405,248

FLOW REGULATING VALVE

FIELD OF THE INVENTION

This invention relates to a flow regulating valve for rotation piston pumps to regulate a useful flow, especially for auxiliary power steering in motor vehicles.

BACKGROUND OF THE INVENTION

Such a flow regulating valve is known, for example, from DE 24 02 017 C2. Flow noises are generated along the control edge of such flow regulating valves as an excess flow runs off into the flowoff duct; these noises are felt to have a disturbing effect particularly in motor vehicles with very softly running engines.

SUMMARY OF THE INVENTION

The purpose of the invention is to reduce the noises that are generated on the flow regulating piston during the regulating process.

This problem is solved by a flow regulating valve containing a spring-loaded flow regulating piston that can be shifted axially in a valve core. The flow regulating piston is impacted on one of its front faces by the pump pressure and on its other front face by a reduced pressure. The flow regulating piston has a control edge on one of its front faces; this control edge can be used to alter a flowoff cross section in a flowoff duct. The problem is solved particularly in that the control edge reveals a rounded portion at the transition to the outside diameter of the flow regulating piston. Control edges on flow regulating pistons known so far have always been made in the form of sharp edges in order to attain precisely defined regulating characteristics. By arranging the rounded portion along the control edge, one can obtain flow conditions that generate less noises and where, rather surprisingly, one can nevertheless achieve precisely defined characteristics.

Such a rounded portion can be used with very good effect also on flow regulating pistons that have a negative bezel along their control edge. A negative bezel is formed by means of a ring-shaped groove—that is worked in on the front surface of the flow regulating piston—together with the generated surface of the flow regulating piston. Particularly weak noises appear when a positive bezel is arranged between the negative bezel and the rounded area adjoining the generated surface.

The invention is not confined to the combinations of features described in the claims. The expert can figure out additional meaningful possibilities of combining claims and individual claim features from the problem statement.

BRIEF DESCRIPTION OF THE DRAWINGS

The invention is explained below in greater detail with the help of three practical examples illustrated in the drawing.

DETAILED DESCRIPTION OF THE PREFERRED EMBODIMENTS

Figure 1:
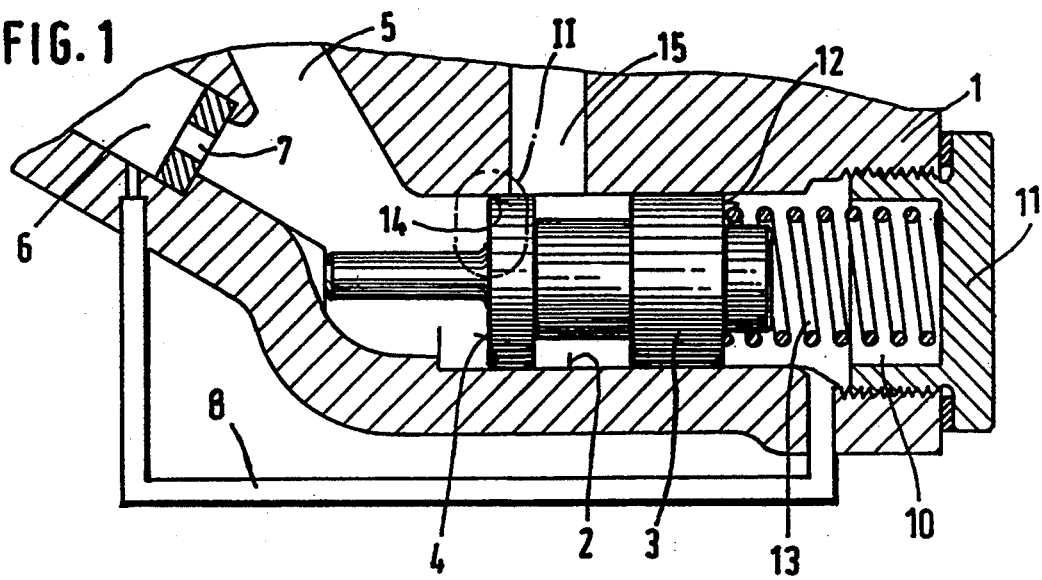
FIG. 1 is a longitudinal profile through a flow regulating valve in a rotation piston pump.

A flow regulating piston 3 is arranged in an axially movable fashion in a valve core [borehole] 2 in a valve housing 1 that is arranged on a rotation piston pump not illustrated, for example, a vane [cell] pump. On one of its front surfaces 4, flow regulating piston 3 is impacted by pump pressure from a pressure duct 5 of the rotation piston pump. A working line 6 leads from pressure duct 5 via a flow regulating choke 7 to a consumer, not illustrated, for example, an auxiliary power steering. From working line 6, a control line 8 leads to a control chamber 10 that is limited by the valve core 2, a housing lid 11, and the other front surface 12 of flow regulating piston 3. Flow regulating piston 3 is loaded by a pressure spring 13 that is arranged in control chamber 10.

On one of its front surfaces 4, flow regulating piston 3 reveals a control edge 14 that—when flow regulating piston 3 is in the neutral position—blocks a flowoff duct 15.

Flow regulating piston 3 is adjusted against the force of pressure spring 13 by a pressure difference generated by flow regulating choke 7. Here, a flowoff cross section from valve core 2 into flowoff duct 15 can be altered by control edge 14. The regulating flow regulated by the flow regulating valve is supplied through flowoff duct 15 to the suction side of the rotation piston pump for charging.

Figure 2:
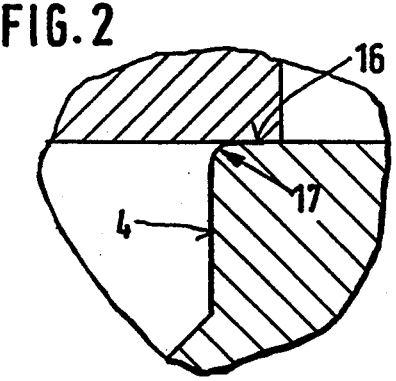
FIGS. 2 to 4 represent an enlarged detail corresponding to segment II in FIG. 1 in the three versions.
Figure 3:
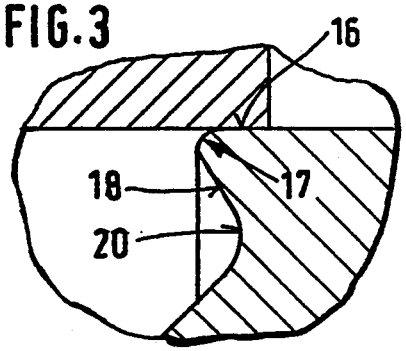

According to the invention, control edge 14 at the transition to generated surface 16 of valve regulating piston 3 has a rounded portion 17. This rounded portion is illustrated in FIG. 2 in a first practical example where flow regulating piston 3 reveals a radially extending front surface 4. In the practical example according to FIG. 3, control edge 14 reveals a negative bezel or chamfer 18 that is formed between a ring-shaped groove 20 that is worked into front surface 4 and generated surface 16. Here again, rounded portion 17 is arranged at the transition from negative bezel 18 to generated surface 16.

Figure 4:
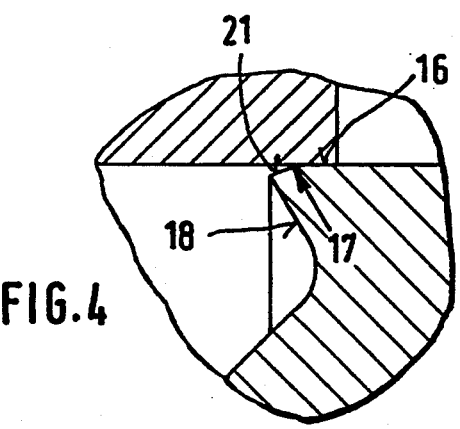

The practical example according to FIG. 4 also reveals a negative bezel 18. Here, however, a positive bezel 21 is arranged in addition between negative bezel and rounded portion 17. In this practical example, likewise, rounded portion 17 directly adjoins generated surface 16. Positive bezel 21 can reveal differing angles with respect to the valve core 2. The angle chosen here depends on the other dimensions and shapes of the flow ducts.

Rounded portion 17 is best formed by a radius. Here, the radius, for example, can amount to between 0.5 percent and 15.0 percent of the outside diameter of the generated surface 16 of flow regulating piston 3.

We claim:

1. Flow regulating valve for rotation piston pumps to regulate a useful flow, especially for auxiliary power steering in motor vehicles with a spring-loaded flow regulating piston (3) that is axially movable in a valve core (2), where said flow regulating piston (3) is impacted on a first front surface (4) by pump pressure from a rotation piston pump and on a second front surface (12) by a biasing pressure and wherein said first front surface (4) includes a control edge (14) for altering a flowoff cross section in a flowoff duct (15), wherein said control edge (14) has a rounded portion (17) at the transition between said first front surface and an outer surface (16) at an outside diameter of said flow regulating piston (3), said outer surface interacting with said flowoff duct, said control edge (14) further including a negative bezel (18), and said rounded portion (17) lies between said negative bezel (18) and said outer surface (16) of said flow regulating piston (3).

2. Flow regulating valve for rotation piston pumps to regulate a useful flow, especially for auxiliary power steering in motor vehicles with a spring-loaded flow regulating piston (3) that is axially movable in a valve core (2), where said flow regulating piston (3) is impacted on a first front surface (4) by pump pressure from a rotation piston pump and on a second front surface (12) by a biasing pressure and wherein said first front surface (4) includes a control edge (14) for altering a flowoff cross section in a flowoff duct (15), wherein said control edge (14) has a rounded portion (17) at the transition between said first front surface and an outer surface (16) at an outside diameter of said flow regulating piston (3), said outer surface interacting with said flowoff duct, wherein said control edge (14) further comprises a negative bezel (18) and a positive bezel, wherein said positive bezel (21) is arranged between said negative bezel (18) and said rounded portion (17) that adjoins said outer surface (16).

3. Flow regulating valve according to claim 2, wherein said round portion (17) has a radius.

4. Flow regulating valve according to claim 1 wherein said rounded portion (17) has a radius.

5. Flow regulating valve according to claim 4, wherein said radius is between 0.5 percent and 15.0 percent of said outside diameter of said flow regulating piston (3).

6. Flow regulating valve according to claim 1, wherein said round portion (17) has a radius.

* * * * *